(12) United States Patent
D'urso et al.

(10) Patent No.: US 7,638,182 B2
(45) Date of Patent: Dec. 29, 2009

(54) METHOD FOR PRODUCING MICROCHANNELS IN DRAWN MATERIAL

(75) Inventors: Brian R D'urso, Clinton, TN (US); John T Simpson, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 9 days.

(21) Appl. No.: 11/460,658

(22) Filed: Jul. 28, 2006

(65) Prior Publication Data

US 2008/0026188 A1    Jan. 31, 2008

(51) Int. Cl.
*B32B 3/20* (2006.01)
*B32B 3/26* (2006.01)
*B32B 3/00* (2006.01)

(52) U.S. Cl. ................. 428/188; 428/304.4; 428/312.6

(58) Field of Classification Search ................. 428/156, 428/167, 188, 312.6, 314.2, 315.5, 304.4, 428/312.2; 501/39; 65/31, 32.5, 393, 429, 65/22; 385/37, 120, 125
See application file for complete search history.

(56) References Cited

U.S. PATENT DOCUMENTS

| 2,221,709 | A | | 11/1940 | Hood et al. |
| 2,286,275 | A | | 6/1942 | Hood et al. |
| 2,315,328 | A | | 3/1943 | Hood et al. |
| 5,264,722 | A | * | 11/1993 | Tonucci et al. ............. 257/443 |
| 6,174,352 | B1 | * | 1/2001 | Semerdjian et al. ............. 96/8 |
| 2003/0230112 | A1 | | 12/2003 | Ikeda et al. |
| 2006/0024478 | A1 | | 2/2006 | D'Urso et al. |
| 2006/0024508 | A1 | | 2/2006 | D'Urso et al. |

\* cited by examiner

*Primary Examiner*—David R Sample
*Assistant Examiner*—Catherine Simone
(74) *Attorney, Agent, or Firm*—Novak Druce + Quigg; Gregory A. Nelson; Gregory M. Lefkowitz

(57) ABSTRACT

A microchannel glass article includes a glass body having a porous, spinodal nanostructure and defining at least one microchannel extending from a surface of the article substantially through the article.

5 Claims, 10 Drawing Sheets

METHOD FOR PRODUCING MICROCHANNELS IN DRAWN MATERIAL

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

CROSS-REFERENCE TO RELATED APPLICATIONS

Specifically referenced are: U.S. Pat. No. 7,150,904 issued on Dec. 19, 2006 to D'Urso and Simpson entitled "Composite, Ordered Material Having Sharp Surface Features", the entire disclosure of which is incorporated herein by reference; and U.S. Pat. No. 7,258,731 issued on Aug. 21, 2007 to D'Urso and Simpson entitled "Composite, Nanostructured, Super-Hydrophobic Material", the entire disclosure of which is incorporated herein by reference.

BACKGROUND OF THE INVENTION

Two methods of making "structured" drawn glass, having micro- or nano-channels in the direction of the draw are commonly known and used. The first method is to start with a preform that contains two kinds of glass. The core glass is easily etched in acid, while the cladding is not etchable. The preform is drawn into fiber, cut into pieces, and the pieces are bundled together in parallel. This drawing and bundling can be repeated many times. Finally, the last bundle is sliced perpendicular to the drawing direction into typically 1 millimeter thick wafers and the core glass is etched out from both sides leaving an array of holes. The difficulty is that the cut wafer, if more than a few millimeters thick, the etching process takes a prohibitively long time, since the core glass is etched out through increasingly long, narrow channels. The product produced is known as microchannel or microchannel glass.

The second method is used to make structured optical fiber (also known as photonic crystal fiber or holey fiber). In this case, the preform has holes through it which can be produced by bundling solid and hollow rods or by bundling two kinds of glass, fusing and etching out one glass (Falkenstein, et al, Optics Letters vol. 29, p. 1858, 2004). In either case, the preform has holes through it when it is ready for drawing. The preform is then drawn once or repeatedly to make the fiber. The difficulty is that the holes tend to collapse and/or distort during the drawing process. The method is very sensitive to drawing conditions, and it is difficult to make specimens that have no significant distortion.

BRIEF SUMMARY OF THE INVENTION

In accordance with one aspect of the present invention, the foregoing and other objects are achieved by a microchannel glass article that includes a glass body having a porous, spinodal nanostructure and defining at least one microchannel extending from a surface of the article substantially through the article.

In accordance with another aspect of the present invention, a method of making a microchannel glass article includes the steps of: fabricating a pre-etch composite that includes a structural phase including a phase-separating glass composition, and a fugitive phase that defines at least one microchannel fugitive core extending from a surface of the pre-etch composite substantially through the pre-etch composite; heating the pre-etch composite to effect spinodal phase separation of the phase-separating glass composition to form a fugitive sub-phase and a stable sub-phase; and dissolving the fugitive phase and the fugitive sub-phase to form a glass body having a porous, spinodal nanostructure and defining at least one microchannel extending from a surface of the article substantially through the article.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
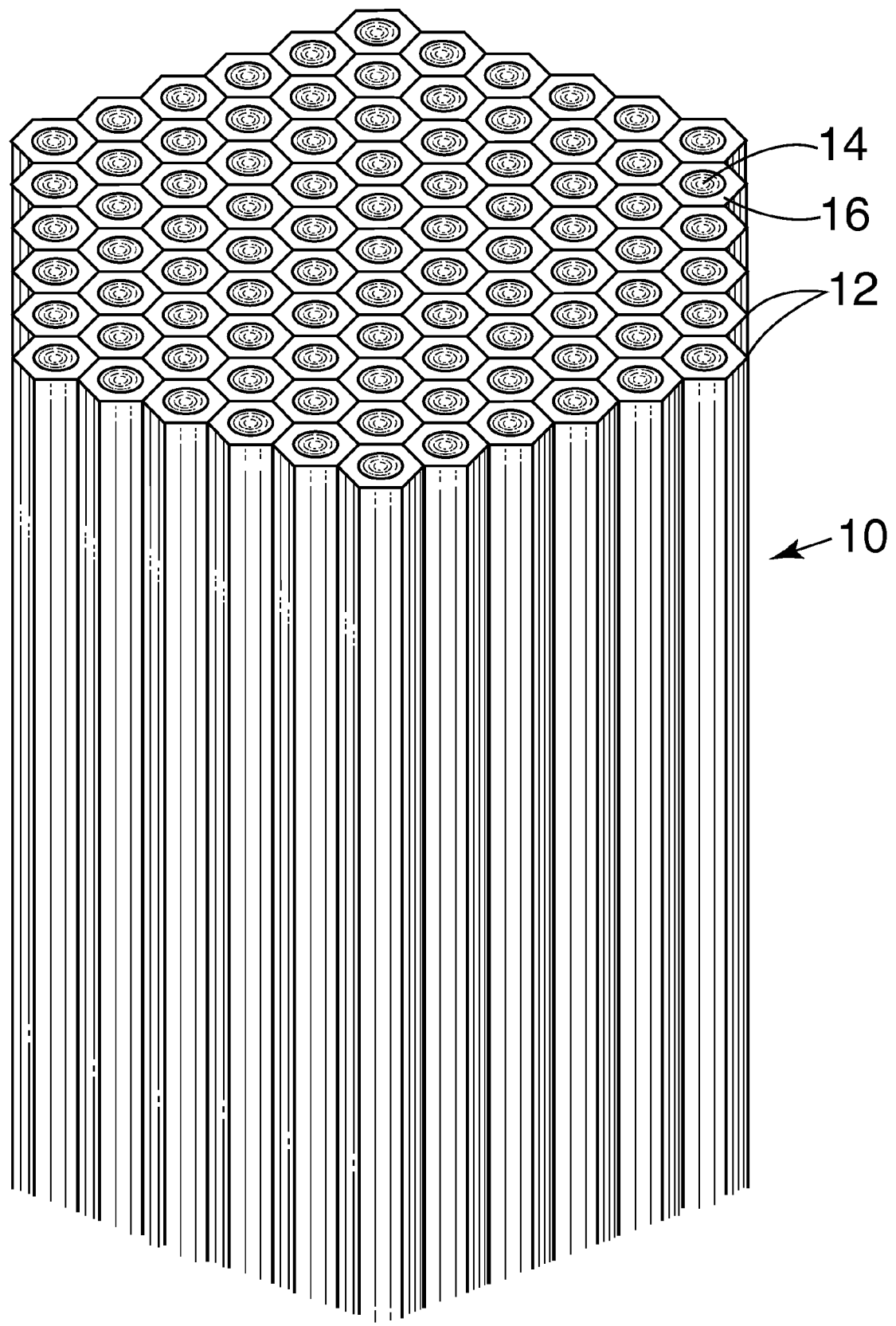
FIG. 1 is a schematic oblique view of a bundle of composite glass rods in accordance with the present invention.

FIG. 1 shows a bundle (preform) 10 of composite (rod-in-tube) glass rods 12, each having a core (rod) 14 and a cladding (or tube) 16 in accordance with the present invention.

The fugitive core 14—where voids (holes, channels, and/or the like) are desired—is comprised of a soluble material, for example, a resin soluble in an organic solvent or a glass composition which is easily etched (dissolved) in acid. The cladding 16 will form the structure of the finished article and is comprised of a phase-separating glass composition such as, for example, a glass composition that is the same or similar to that used for Corning Vycor®. See, for example, U.S. Pat. No. 2,315,328 entitled "High Silica Glass Article" issued to Hood, et al. on Mar. 30, 1943, U.S. Pat. No. 2,286,275 entitled "Method of Treating Borosilicate Glasses" issued to Hood, et al. on Jun. 16, 1942, and U.S. Pat. No. 2,221,709 entitled "Borosilicate Glass" issued to Hood, et al. on Nov. 12, 1940. Above-referenced U.S. Patent Publication No. US 2006/0024508 also provides helpful teachings relating to the use of phase-separating compositions.

Following phase separation, a fugitive phase of the composition is easily dissolved (by a solvent or etched in acid, for example), and a stable phase of the composition is not susceptible to the same solvent or acid as the first phase. The term fugitive is used herein to describe a material or phase that is essentially completely removable by a chemical process.

The composite preform 10 is then drawn in accordance with the teachings of U.S. Patent Publication No. US 2006/0024478. The skilled artisan will recognize that the resulting drawn, (usually fused) pre-etch composite can be cut, re-bundled, and drawn until the desired reduction in size and spacing of the cores 14 is attained. The final size and spacing of the cores 14 can be varied greatly, depending on the desired functionality of the product.

Figure 2:
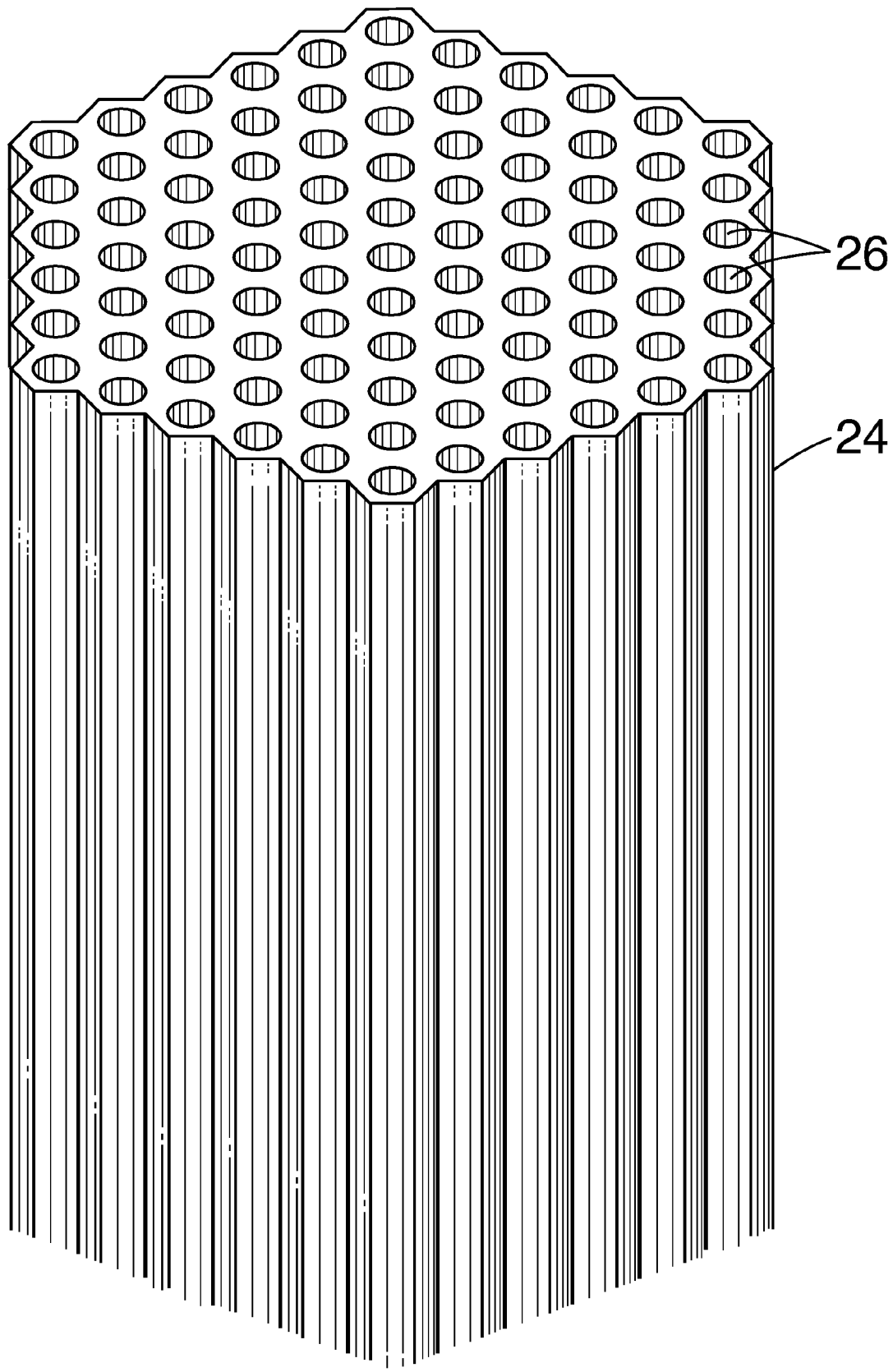
FIG. 2 is a schematic oblique view of an example of microchannel glass made in accordance with the present invention from the bundle of composite rods shown in FIG. 1.
Figure 3:
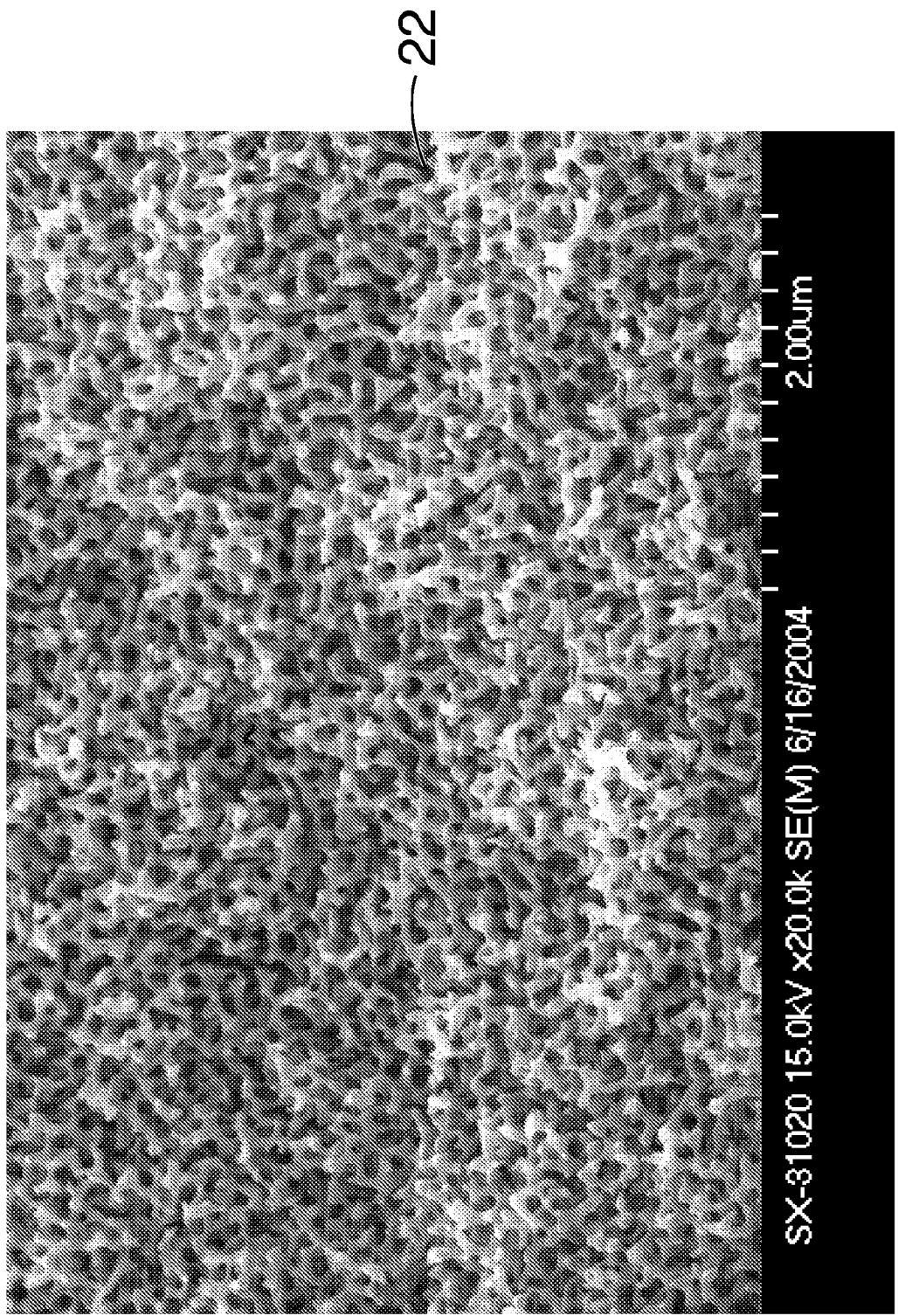
FIG. 3 is a SEM micrograph of a composite glass having a differentially etched surface in accordance with the present invention.
Figure 4:
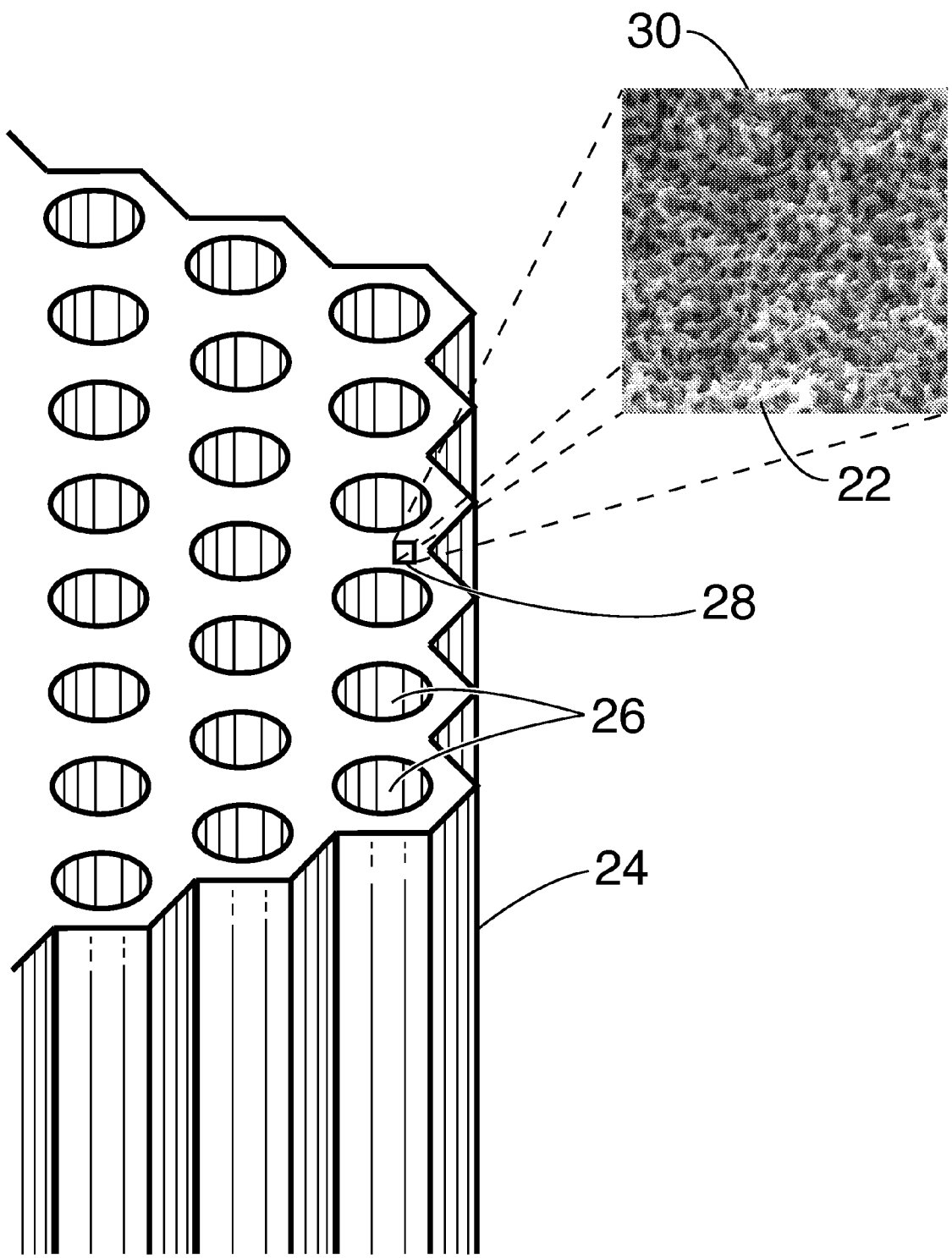
FIG. 4 is an enlarged portion of the microchannel glass shown in FIG. 2 with an inset showing the nanostructure thereof.

Referring additionally to FIGS. 2, 3, and 4, in a chemical process, the fugitive cores 14 and the fugitive phase of the cladding 16 material are dissolved out in an etchant/solvent or a sequence of etchants/solvents from all sides, leaving only the stable phase 22 of the cladding 16 as a porous structure 24 having a spinodal nanostructure. The cladding 16 glass composition can be selected such that the fugitive phase is susceptible to the same solvent or acid as the fugitive core 14, in which case a single etchant/solvent can be used. The cladding 16 glass composition can be selected such that the fugitive phase is susceptible to a different solvent or acid as the fugitive core 14, in which case a sequence of etchants/solvents can be used. The fugitive phase is preferably removed first, followed by removal of the fugitive core 14.

The porous structure 24 defines microchannels 26. A microchannel, for the purposes of describing various embodiments of the present invention, is defined as a channel characterized by an average diameter of at least 50 µm in some embodiments, at least than 1 µm in some embodiments, and at least 20 nm in some embodiments. Moreover, a microchannel has no maximum diameter; the minimum diameter is limited only by the size of the nanostructure of the porous structure 24. The nanostructure is preferably no larger than the microchannel, else the microchannel may become indistinguishable.

In FIG. 4, a small portion 28 of the porous structure 24 is shown as an enlarged inset 30 in order to illustrate the spinodal nanostructure of the stable phase 22. The solvent/etchant can access the entire interior of the pre-etch composite by dissolving the fugitive phase of the cladding 16. An advantage of such a process is that the solvent is not limited to access the interior regions of the fugitive cores 14 only through voids created by dissolution of the cores 14 themselves. By having lateral access to the cores 14, the process is of shorter duration and ensures complete removal of fugitive cores 14.

Figure 5:
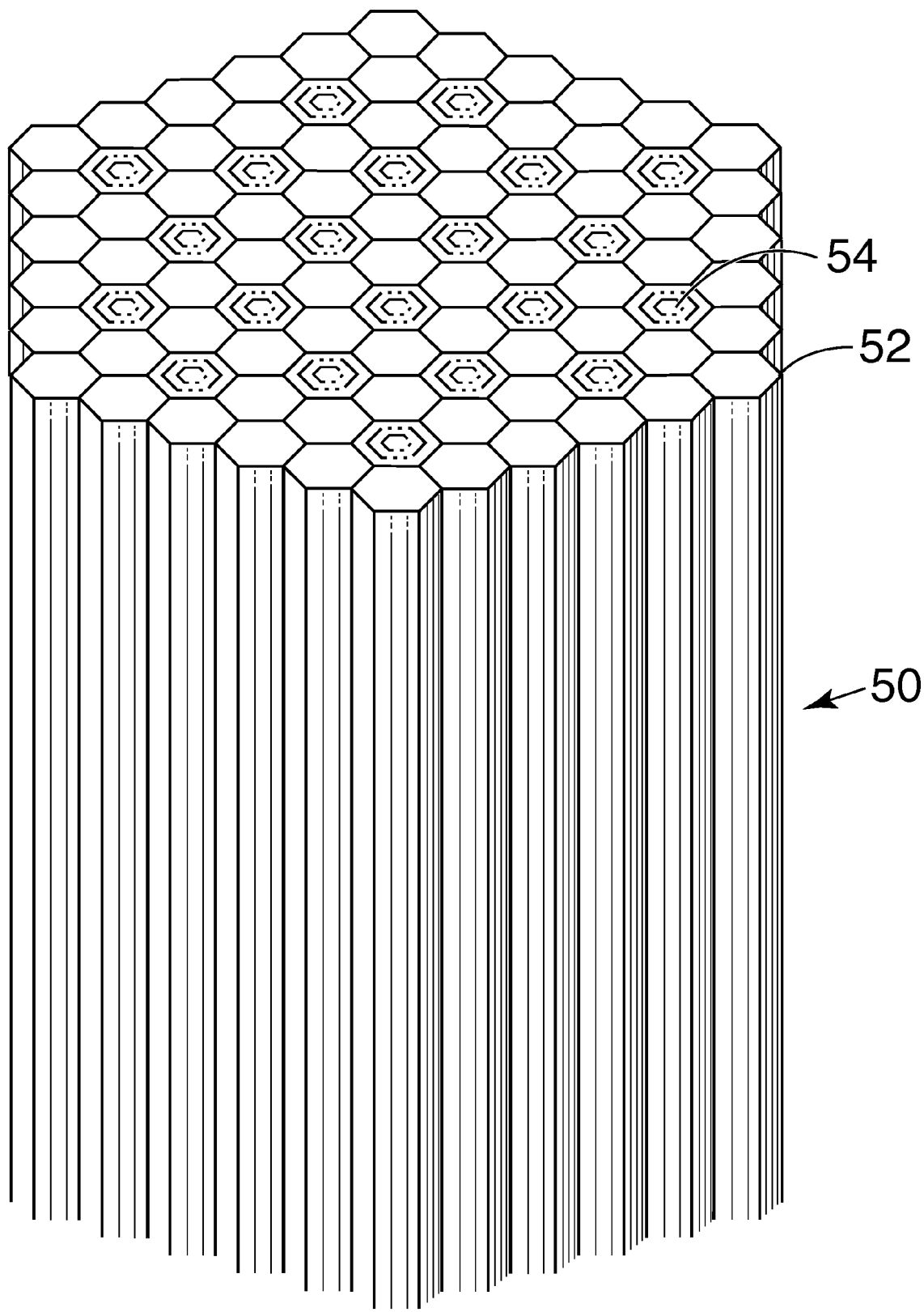
FIG. 5 is a schematic oblique view of a bundle of glass rods in accordance with the present invention.
Figure 6:
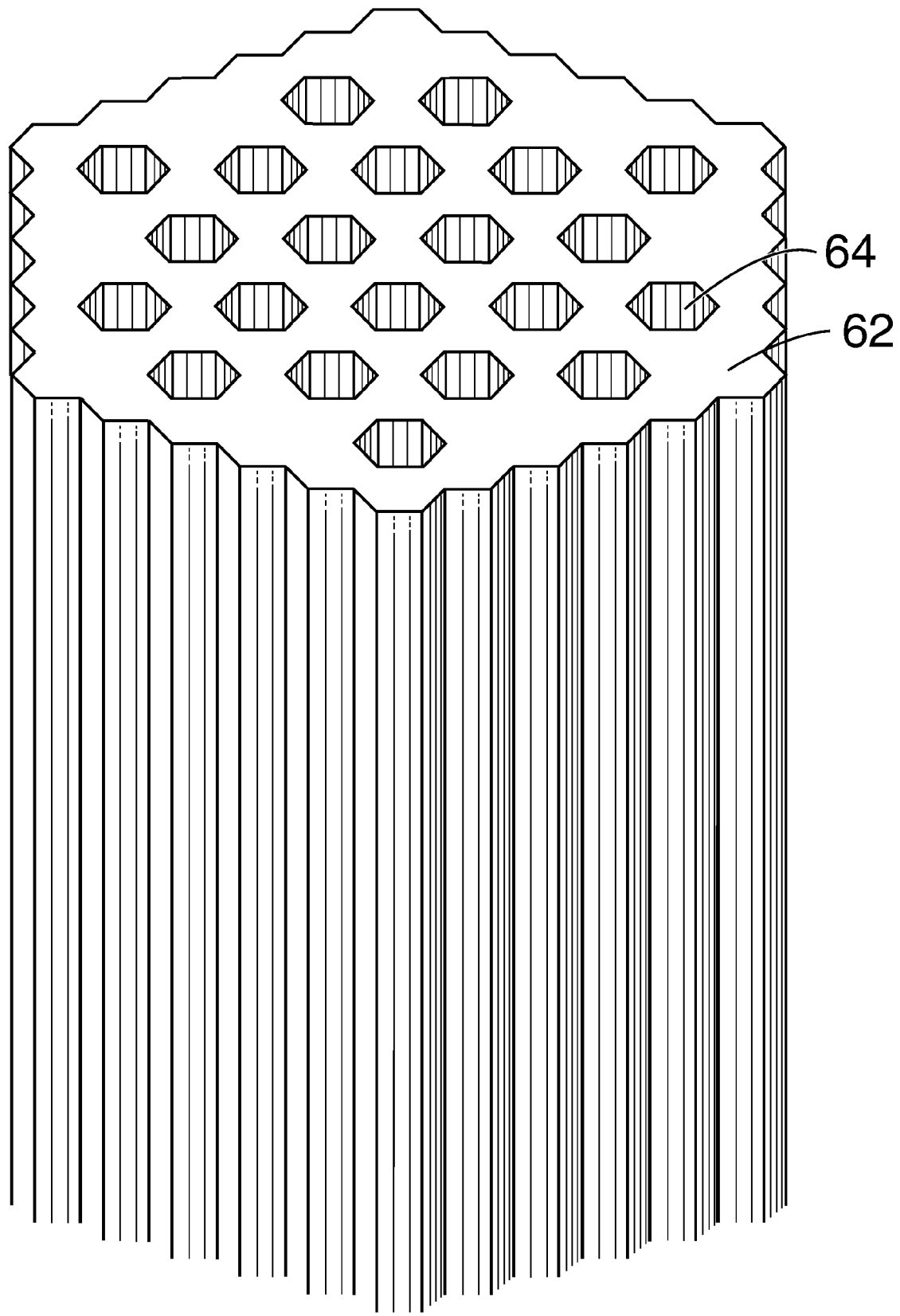
FIG. 6 is a schematic oblique view of an example of microchannel glass made in accordance with the present invention from the bundle of composite rods shown in FIG. 5.
Figure 7:
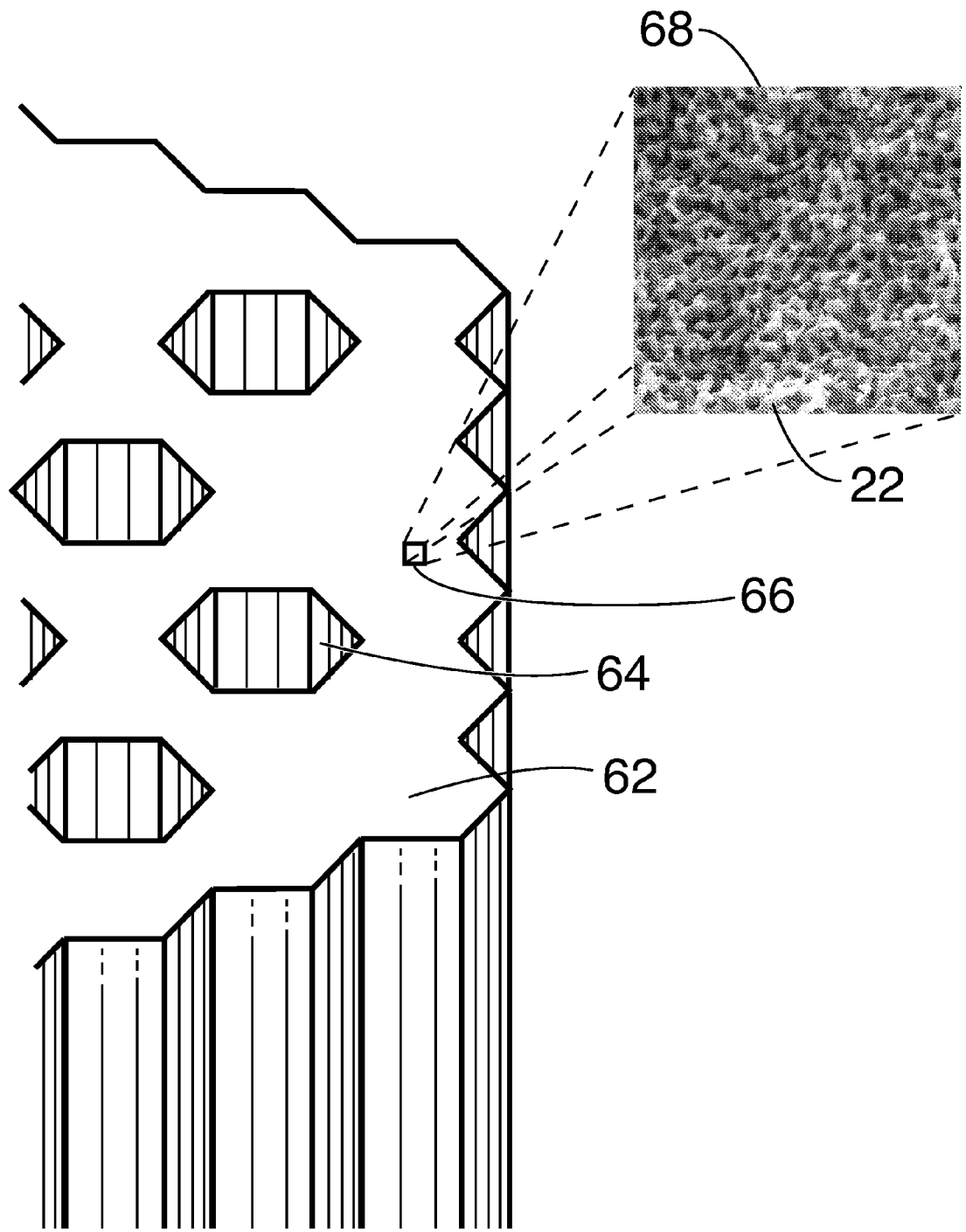
FIG. 7 is an enlarged portion of the microchannel glass shown in FIG. 6 with an inset showing the nanostructure thereof.

FIGS. 5-7 illustrate another embodiment of the invention; discrete rods having different etching characteristics are used to construct the preform 50. Where voids are desired, fugitive core rods 54, comprised of a glass composition which is easily etched in acid. The surrounding rods 52 are comprised of a phase-separating glass composition as described hereinabove.

The preform 50 is then drawn in accordance with the teachings of U.S. Patent Publication No. US 2006/0024478. The skilled artisan will recognize that the resulting drawn, (usually fused) composite fiber can be cut, re-bundled, and drawn until the desired reduction in size and spacing of the core rods 54 is attained. The final size and spacing of the core rods 54 can be varied greatly, depending on the desired functionality of the product.

In an etching process, the fugitive core rods 14 and the fugitive phase of the surrounding rods 52 are etched/dissolved out in an etchant/solvent from all sides, leaving only the stable phase 22 of the surrounding rods 52 as a porous structure 62 having a spinodal nanostructure. The porous structure 62 defines microchannels 64. In FIG. 4, a small portion 66 of the porous structure 62 is shown as an enlarged inset 68 in order to illustrate the spinodal nanostructure of the stable phase 22.

The skilled artisan will recognize that the invention can be used to make a single strand of porous glass, having a single microchannel. The skilled artisan will further recognize that the thickness of the structure between the microchannels (spacing apart of the microchannels) can be varied as desired.

The porous structures 24, 62 can be densified (consolidated) by heating to an elevated temperature to close up the pores while leaving the microchannels 26, 64 open. Moreover, the skilled artisan will recognize that, utilizing processes such as those taught in U.S. Pat. No. 2,315,328 (referenced above), filler material(s) in the form of a liquid, colloid, or suspension can be impregnated into the nanostructure in and solidified, sintered, or consolidated to provide a solid structure with open microchannels remaining therethrough.

EXAMPLE I

Microchannel glass structures were made beginning with a bundle of glass as shown in FIG. 1. The cladding glass was a sodium borosilicate glass which is known to undergo phase separation via spinodal decomposition when properly heat treated; one of the phases which results from heat treating is high in silica and thus highly resistant to etching in acid, while the second phase is low in silica and is much more susceptible to etching by strong acids. The composition of the cladding glass followed an example in above-referenced U.S. Pat. No. 2,286,275; it contained 62.3% $SiO_2$, 27.4% $B_2O_3$, 6.8% $Na_2O$, and 3.5% $Al_2O_3$ (by wt. %).

The core glass was a high-borate, low-silica glass which was selected to match the thermal expansion and softening point of the rod glass, while being easily and completely etched by strong acids.

The preform was drawn in a fiber draw tower by heating to 775° C. and drawing at 8 m/min, to produce fiber of approximately 575 µm diameter. A vacuum was applied to the top of the preform to eliminate any gap between the preform rod and tube. The fiber was automatically cut to 80 cm lengths as it was drawn.

After drawing, approximately 1000 fibers were stacked together in a 19 mm inside diameter tube of the same composition of the cladding to make a secondary preform. The fibers were crudely bundled together and allowed to form a mostly close-packed lattice on their own. (The pattern of bundling at this stage determines the structure of the final fiber. Other varieties of fiber, such as solid fibers of a single glass composition, could be included to produce a larger hole or solid core in the final fiber.) The secondary preform was subjected to drawing in a fiber draw tower at the same temperature as the first draw, and the fiber was drawn down to approximately 550 µm diameter. As in the previous draw, a vacuum was applied to the top of the preform to eliminate any gaps in the preform.

Figure 8:
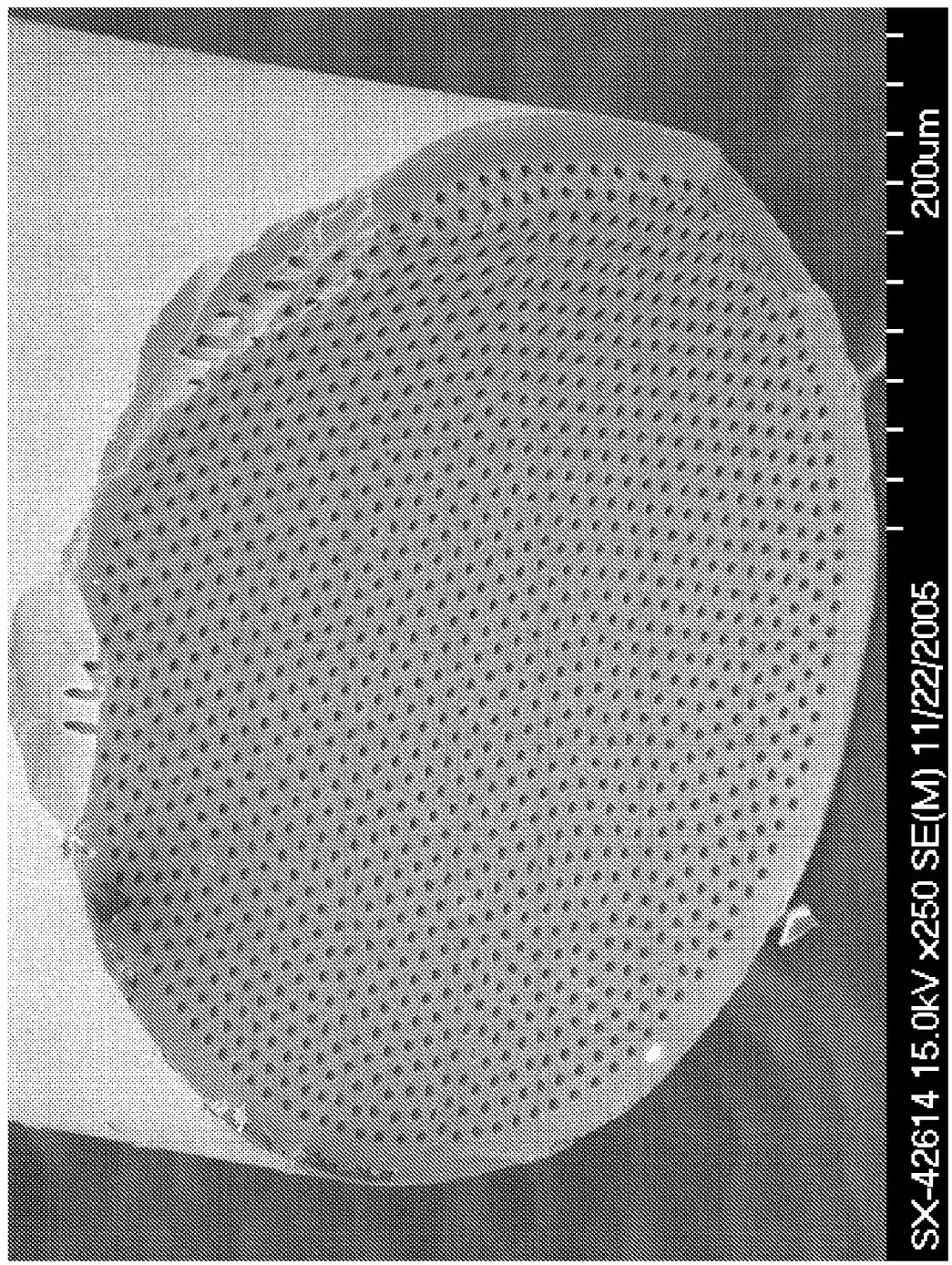
FIG. 8 is a SEM micrograph of a microchannel glass article made in accordance with the present invention.
Figure 9:
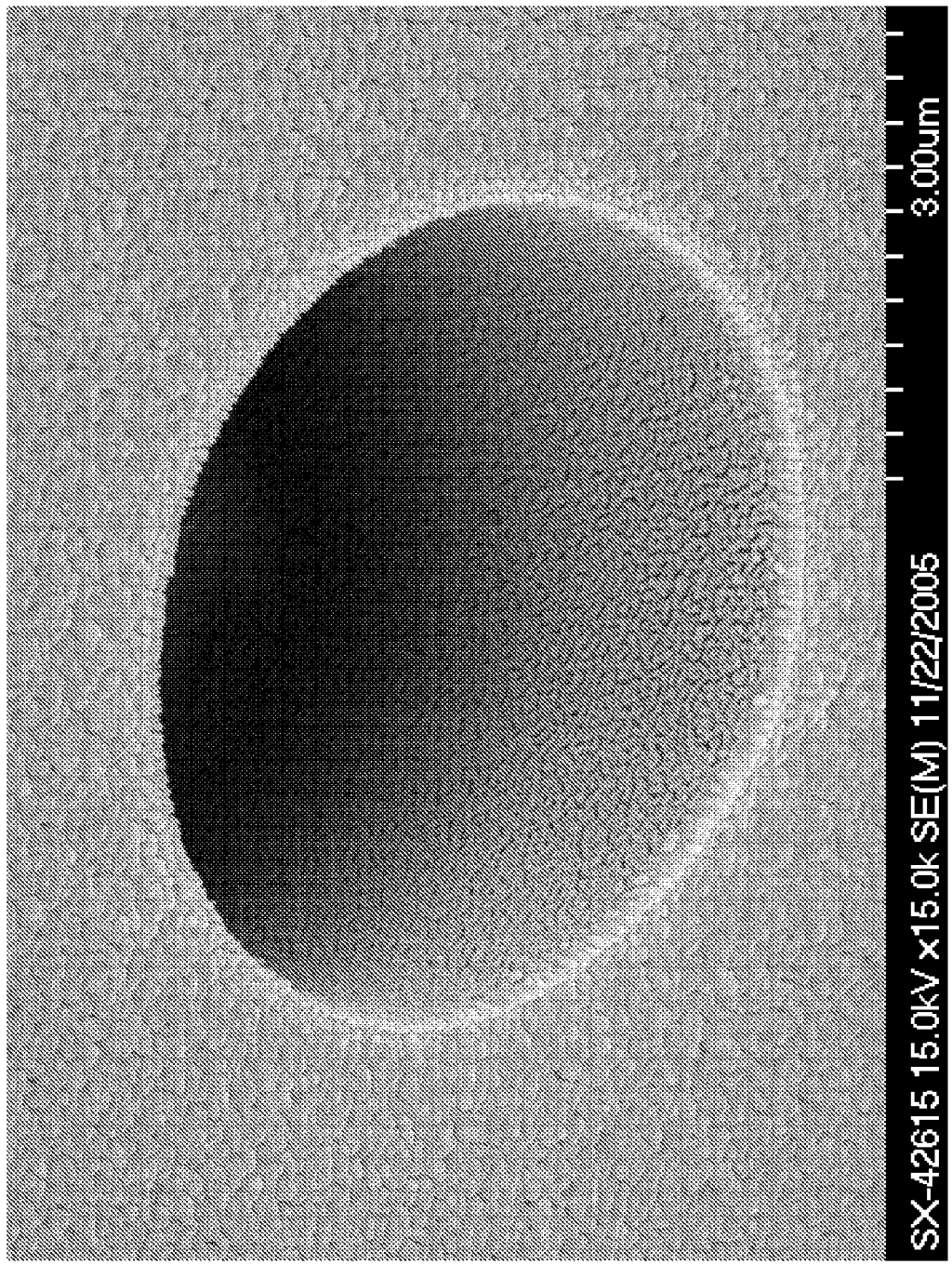
FIG. 9 is a SEM micrograph of a hole in the microchannel glass article shown in FIG. 8, at an increased magnification.
Figure 10:
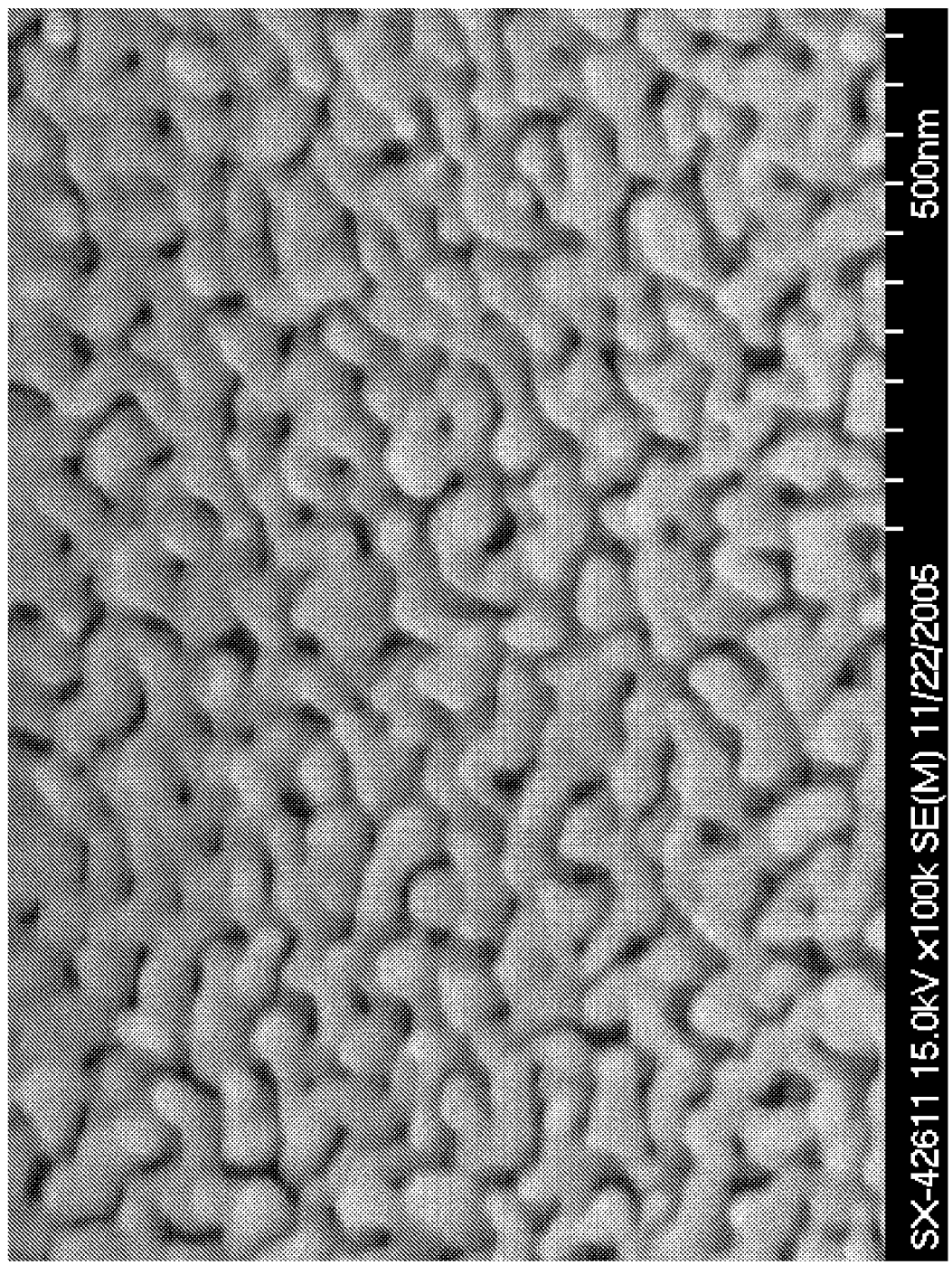
FIG. 10 is a SEM micrograph of an area in the hole in the microchannel glass article shown in FIG. 9, at a further increased magnification.

The drawn secondary preform was heated to 580° C. for 3 hours, then cooled at 25° C. per hour to allow the cladding glass to decompose via spinodal decomposition. The fiber was then immersed in hydrochloric acid and heated to >90° C. for 3 hours to etch out one phase of the cladding glass, leaving it porous, and also to etch out the entire core glass, at least partly through the pores of the cladding glass. The structure of the resulting article is shown in FIGS. 8, 9, and 10. The porosity of the remaining glass after etching can be seen within one of the holes in the fiber in FIGS. 9 and 10. Since the glass remained in solid form throughout the etching process, the the holes neither collapsed nor became deformed.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A microchannel glass article comprising a glass body having a porous, spinodal nanostructure, said glass body defining at least one microchannel extending from a surface of said article though said article to an opposite surface of said article, said spinodal nanostructure being no larger than said at least one microchannel so that said at least one microchannel is distinguishable from said spinodal nanostructure.

2. A microchannel glass article in accordance with claim 1 wherein said glass body further comprises a plurality of parallel microchannels.

3. A microchannel glass article in accordance with claim 1 wherein said microchannel is characterized by an average diameter of at least 50 µm.

4. A microchannel glass article in accordance with claim 3 wherein said microchannel is characterized by an average diameter of at least 1 µm.

5. A microchannel glass article in accordance with claim 4 wherein said microchannel is characterized by an average diameter of at least 20 nm.

* * * * *